(12) United States Patent
Coulson (10) Patent No.: US 9,095,130 B2
(45) Date of Patent: Aug. 4, 2015

(54) ICE FISHING SIGNALING APPARATUS WITH FISH BITE/HOOKED FISH INDICATOR

(71) Applicant: Troy Martin Coulson, Linwood, MN (US)

(72) Inventor: Troy Martin Coulson, Linwood, MN (US)

(*) Notice: Subject to any disclaimer, the term of this patent is extended or adjusted under 35 U.S.C. 154(b) by 158 days.

(21) Appl. No.: 13/780,597

(22) Filed: Feb. 28, 2013

(65) Prior Publication Data

US 2013/0227873 A1 Sep. 5, 2013

Related U.S. Application Data

(60) Provisional application No. 61/605,674, filed on Mar. 1, 2012.

(51) Int. Cl.
*A01K 97/12* (2006.01)
*A01K 97/01* (2006.01)

(52) U.S. Cl.
CPC ............. *A01K 97/125* (2013.01); *A01K 97/01* (2013.01); *A01K 97/12* (2013.01)

(58) Field of Classification Search
CPC ...... A01K 97/12; A01K 97/125; A01K 97/01
USPC ......................................... 43/17, 4
See application file for complete search history.

(56) References Cited

U.S. PATENT DOCUMENTS

| | | | | |
|---|---|---|---|---|
| 963,654 | A * | 7/1910 | Schindler | 43/17 |
| 1,173,827 | A * | 2/1916 | Marsh | 43/17 |
| 1,250,053 | A * | 12/1917 | Tukey | 43/42.72 |
| 1,529,949 | A * | 3/1925 | Good | 43/17 |
| 1,815,662 | A * | 7/1931 | Bacon | 43/17 |
| 1,986,683 | A * | 1/1935 | Schmeltzer | 43/17 |
| 2,088,201 | A * | 7/1937 | Goertzen | 43/17 |
| 2,153,750 | A * | 4/1939 | Goertzen | 43/17 |
| 2,255,959 | A * | 9/1941 | Barber | 43/17 |
| 2,354,279 | A * | 7/1944 | Ross | 43/17 |
| 2,500,078 | A * | 3/1950 | Ingram | 43/17 |
| 2,556,628 | A * | 6/1951 | Nisle, Sr. | 43/17 |
| 2,587,190 | A * | 2/1952 | Merriweather | 43/17 |

(Continued)

FOREIGN PATENT DOCUMENTS

DE  4110782 A1 * 5/1992 ............. A01K 97/12
EP  0422913 B1  12/1993

(Continued)

*Primary Examiner* — Darren W Ark
(74) *Attorney, Agent, or Firm* — Schroeder & Siegfried, P.A.

(57) ABSTRACT

An ice fishing signaling device having a tip-up flag and/or electric light bite indicator, and a hooked fish indicator that is controlled by tension in the fish line is provided to alert a fisherman of the occurrence of hooked fish and the relative size and/or strength of the hooked fish. The hooked fish indicator has a tubular housing with a telescoping indicator rod that is spring-biased within the housing to resist movement. A sustained tension on the fish line equal to or exceeding the bite indicator trigger level is required to withdraw the indicator rod from the housing for signaling the presence of a hooked fish. The indicator rod increases resistance as it is withdrawn for the housing, thus providing a visual indication of the size and/or strength of the hooked fish. The indicator rod may be electrically coupled to a light to provide continuous or blinking illumination only upon the presence of a hooked fish, and an optional air pump is provided for maintaining water circulation and preventing freeze-up of the ice fishing hole.

22 Claims, 7 Drawing Sheets

(56) References Cited

U.S. PATENT DOCUMENTS

| | | | | |
|---|---|---|---|---|
| 2,677,363 A * | 5/1954 | Bryan | | 126/4 |
| 2,722,763 A * | 11/1955 | Miner et al. | | 43/17 |
| 2,732,543 A * | 1/1956 | Mogren | | 43/17 |
| 2,747,569 A * | 5/1956 | Holm et al. | | 43/4 |
| 2,785,493 A | 3/1957 | Thiel | | |
| 2,798,330 A * | 7/1957 | Marshall et al. | | 43/17 |
| 2,816,387 A * | 12/1957 | Crowe et al. | | 43/17 |
| 2,838,196 A * | 6/1958 | Chapman | | 43/4 |
| 2,877,595 A * | 3/1959 | Steuart | | 43/4 |
| 2,883,784 A * | 4/1959 | Obernolte | | 43/4 |
| 2,901,855 A * | 9/1959 | Todd | | 43/17 |
| 3,025,852 A * | 3/1962 | Quilling | | 43/4 |
| 3,030,122 A * | 4/1962 | Madera | | 43/4 |
| 3,056,227 A * | 10/1962 | Ray | | 43/17 |
| 3,056,272 A * | 10/1962 | Eilers | | 43/4 |
| 3,068,655 A | 12/1962 | Murray et al. | | |
| 3,109,288 A | 11/1963 | Gross | | |
| 3,148,509 A | 9/1964 | Laurie | | |
| 3,170,458 A * | 2/1965 | Anderlie | | 43/4 |
| 3,171,404 A * | 3/1965 | Skog | | 43/4 |
| 3,193,260 A | 7/1965 | Lamb | | |
| 3,221,705 A * | 12/1965 | Saviskas | | 43/17 |
| 3,230,655 A * | 1/1966 | Nomsen | | 43/17 |
| 3,289,850 A | 12/1966 | Gubash | | |
| 3,382,598 A * | 5/1968 | Wilson | | 43/17 |
| 3,387,401 A * | 6/1968 | Stelmach | | 43/17 |
| 3,423,867 A * | 1/1969 | Bartletti | | 43/17 |
| 3,466,781 A * | 9/1969 | Korany et al. | | 43/4 |
| 3,545,118 A * | 12/1970 | Stelmach | | 43/17 |
| 3,555,827 A * | 1/1971 | Herr | | 43/4 |
| 3,645,029 A * | 2/1972 | Roemer | | 43/17 |
| 3,667,873 A | 6/1972 | Cramer, Jr. | | |
| 3,686,887 A | 8/1972 | Bruce | | |
| 3,739,513 A * | 6/1973 | Durham, Jr. | | 43/17 |
| 3,747,253 A | 7/1973 | Gangi et al. | | |
| 3,813,891 A * | 6/1974 | Wootten | | 43/4 |
| 3,857,787 A | 12/1974 | Kinne | | |
| 3,879,880 A * | 4/1975 | Bailey | | 43/17 |
| 4,006,732 A | 2/1977 | Schumm | | |
| 4,051,616 A * | 10/1977 | Mathauser | | 43/17 |
| 4,114,304 A * | 9/1978 | Hedlund | | 43/4 |
| 4,118,882 A * | 10/1978 | Gorsky | | 43/17 |
| 4,214,394 A | 7/1980 | Shogan | | |
| 4,253,262 A * | 3/1981 | Johnson | | 43/17 |
| 4,266,217 A * | 5/1981 | Kao et al. | | 43/17 |
| 4,276,711 A * | 7/1981 | Mathauser | | 43/17 |
| 4,285,154 A * | 8/1981 | Grahl | | 43/17 |
| 4,294,030 A * | 10/1981 | Stewart | | 43/4 |
| 4,300,855 A | 11/1981 | Watson | | |
| 4,418,489 A * | 12/1983 | Mathauser | | 43/17 |
| 4,438,757 A * | 3/1984 | Anderson | | 43/4 |
| 4,458,437 A * | 7/1984 | Ou | | 43/17 |
| 4,461,114 A * | 7/1984 | Riead | | 43/17 |
| 4,466,211 A * | 8/1984 | Mathauser | | 43/17 |
| 4,571,876 A * | 2/1986 | LeClair | | 43/17 |
| 4,667,432 A * | 5/1987 | Torgrimson | | 43/17 |
| 4,693,125 A * | 9/1987 | Krutz et al. | | 43/17 |
| 4,746,253 A * | 5/1988 | Simmons | | 43/17 |
| 4,747,226 A * | 5/1988 | Todd | | 43/4 |
| 4,761,909 A * | 8/1988 | Christian et al. | | 43/4 |
| 4,787,166 A * | 11/1988 | Vogt et al. | | 43/17 |
| 4,790,099 A | 12/1988 | Miller, Jr. | | |
| 4,809,456 A * | 3/1989 | Caparelli et al. | | 43/17 |
| 4,837,965 A | 6/1989 | True | | |
| 4,845,875 A * | 7/1989 | Norwick | | 43/4 |
| 4,910,906 A * | 3/1990 | Schefers et al. | | 43/4 |
| 4,916,846 A * | 4/1990 | Pehm | | 43/17.5 |
| 4,945,668 A * | 8/1990 | Keller | | 43/17 |
| 4,980,986 A * | 1/1991 | Harper | | 43/17 |
| 5,048,220 A * | 9/1991 | Harris | | 43/4 |
| 5,119,578 A * | 6/1992 | Johnson | | 43/17 |
| 5,129,174 A * | 7/1992 | Wilson | | 43/17 |
| 5,170,581 A * | 12/1992 | Lyons | | 43/17 |
| 5,231,784 A * | 8/1993 | Condusta | | 43/17 |
| 5,282,333 A * | 2/1994 | Klinkhamer | | 43/4 |
| 5,341,588 A * | 8/1994 | Lizotte | | 43/1 |
| 5,396,726 A | 3/1995 | Zepeda, Sr. | | |
| 5,526,601 A * | 6/1996 | Onuma et al. | | 43/17 |
| 5,540,009 A * | 7/1996 | Sykes | | 43/4 |
| 5,564,213 A | 10/1996 | Rinehart | | |
| 5,598,656 A * | 2/1997 | Strasser | | 43/17 |
| 5,676,889 A | 10/1997 | Belgin | | |
| 5,758,449 A * | 6/1998 | Munsterman et al. | | 43/17 |
| 5,915,940 A | 6/1999 | Gross et al. | | |
| 5,956,882 A * | 9/1999 | Deimel | | 43/4 |
| 6,079,406 A | 6/2000 | Bryzek | | |
| 6,088,945 A * | 7/2000 | Sanderfoot | | 43/17 |
| 6,119,389 A * | 9/2000 | Walker | | 43/17 |
| 6,354,036 B1 | 3/2002 | Carlson et al. | | |
| 6,393,753 B1 * | 5/2002 | Walker | | 43/17 |
| 6,519,893 B2 * | 2/2003 | Shook | | 43/17 |
| 6,564,496 B2 * | 5/2003 | Scherg | | 43/17 |
| 6,564,696 B2 | 5/2003 | Koncelik, Jr. | | |
| 6,676,837 B2 | 1/2004 | Keeton, Jr. | | |
| 6,694,662 B1 | 2/2004 | McClure | | |
| 6,708,441 B2 * | 3/2004 | Dirito | | 43/17 |
| 6,907,689 B2 | 6/2005 | Pendzimas | | |
| 6,938,367 B2 * | 9/2005 | Cameron et al. | | 43/17 |
| 6,981,346 B1 | 1/2006 | Wiezycki | | |
| 7,124,534 B1 * | 10/2006 | Kacir | | 43/15 |
| 7,159,354 B1 * | 1/2007 | White | | 43/17 |
| 7,343,708 B2 | 3/2008 | Pieczynski | | |
| 7,355,147 B2 * | 4/2008 | Wang | | 43/17 |
| 7,478,498 B1 * | 1/2009 | Barnhart | | 43/17 |
| 7,562,488 B1 * | 7/2009 | Perkins et al. | | 43/17 |
| 7,624,531 B2 * | 12/2009 | Kirby | | 43/17 |
| 7,963,065 B1 * | 6/2011 | Copeland | | 43/17 |
| 8,336,248 B2 | 12/2012 | Miškatović | | |
| 8,464,461 B1 * | 6/2013 | Perkins et al. | | 43/17 |
| 8,739,458 B1 * | 6/2014 | Michael | | 43/15 |
| 8,839,548 B2 * | 9/2014 | Manlick et al. | | 43/17 |
| 2004/0068914 A1 | 4/2004 | Wellard et al. | | |
| 2007/0014680 A1 * | 1/2007 | Gifford et al. | | 43/4 |
| 2007/0068062 A1 * | 3/2007 | Zeglen | | 43/17 |
| 2007/0187145 A1 | 8/2007 | Periard | | |
| 2007/0234629 A1 * | 10/2007 | Brooks | | 43/17 |
| 2009/0241403 A1 | 10/2009 | Foss | | |
| 2011/0186133 A1 * | 8/2011 | Hiatt et al. | | 43/4 |
| 2014/0137460 A1 * | 5/2014 | Weber | | 43/21.2 |
| 2015/0000175 A1 * | 1/2015 | Bryzek | | 43/17 |

FOREIGN PATENT DOCUMENTS

| | | | | |
|---|---|---|---|---|
| GB | 2047061 A * | 11/1980 | | A01K 97/12 |
| GB | 2074831 A * | 11/1981 | | A01K 97/12 |

* cited by examiner

ICE FISHING SIGNALING APPARATUS WITH FISH BITE/HOOKED FISH INDICATOR

CROSS-REFERENCE TO RELATED APPLICATIONS

This application claims the benefit of U.S. Provisional Application No. 61/605,674, filed on Mar. 1, 2012, entitled Air Hole Ice Fishing Tip-up Unit, the entire disclosure of which is incorporated herein by reference.

FIELD

The present disclosure relates generally to the art of fishing, and more particularly to signaling devices utilized for ice fishing to alert a fisherman of the occurrence fish bite and/or hooked fish.

BACKGROUND

The statements in this section merely provide background information related to the present disclosure and may not constitute prior art.

Ice fishing tip-up devices in general are well known in the art and have heretofore incorporated a wide variety of different methods of alerting to the occurrence of a fish bite. Such devices usually incorporate some form of mechanical tip-up flag signal, and/or incorporate additional or alternative lighting or audible signaling mechanisms for alerting to the occurrence of a fish bite. However, most conventional ice fishing signaling devices suffer from the inherent problem that they provide little of no information as to the relative size or strength of the fish striking the bait, or whether the fish has actually taken the bait and become hooked.

It is a common occurrence for a fish to make an initial strike or nibble at a baited hook without fully taking the bait and becoming hooked. Upon such an event, conventional tip-up signaling devices, such as mechanical tip-up flag devices, are usually tripped, alerting the fisherman to the occurrence of a fish bite. Once the flag is released, however, the fisherman receives no additional information to indicate whether the fish has been hooked, or any information as to the potential size or strength of the fish that struck the bait. Consequently, the fisherman is left with no choice but to go check the bait and reset the signaling device.

Even with signaling devices offering added lighting and/or audible signals, such devices are typically coupled to the mechanical tip-up flag signal and actuated simultaneously therewith; accordingly, they offer no additional benefit to the fisherman. While other audible or electric lighting devices are available that operate independently of any mechanical tip-up signaling device, such devices are still incapable of providing the fisherman with any useful information as to the potential size or strength of the fish being hooked or striking the bait.

Such conventional signaling devices are also frequently subject to false alarms caused by wind and/or vibration. Once triggered, the fisherman has no sense as to the urgency required to tend the fishing line, as there is no clear indication that a fish has been hooked, or if hooked, how significant is the size or strength of the fish. Thus, the fisherman must repeatedly check and reset the signaling device, oftentimes in temperatures and wind conditions making such activity extremely tedious and unpleasant.

As temperatures drop, ice formation in the fishing hole also becomes problematic. Also, problems oftentimes occur with the working elements of such conventional signaling devices that are exposed to such weather conditions. Consequently, in addition to checking and resetting the signaling device, the fisherman must periodically clear ice and snow from the signaling device and fishing hole to prevent freeze-up. This is not only a nuisance to the fisherman, but it frequently results in disturbance of the fishing line, and the abrupt movement of the water caused by clearing the ice from the hole results in fish being scared away.

It is therefore an object of the present invention to provide a new and improved ice fishing signaling apparatus which alerts a fisherman of the occurrence of a hooked fish and provides information as to the relative size and/or strength of the hooked fish.

Another object of the present invention is to provide a new and improved ice fishing signaling apparatus which provides multiple alert mechanisms for signaling a fisherman of the occurrence of a fish bite; the occurrence of a hooked fish; and an indication of the relative size and/or strength of the hooked fish.

Another object of the present invention is to provide a new and improved ice fishing signaling apparatus having a hooked fish indicator that provides relative fish size and/or strength information, the working elements of which are protected from snow and ice freeze-up within a protective housing.

Still another object of the present invention is to provide an improved ice fishing signaling apparatus that incorporates means for maintaining the fishing hole clear of ice without the need for repeated disturbance of the fishing line and signaling device while removing ice from the hole.

SUMMARY

According to various aspects of the present invention, an ice fishing signaling device is provided which includes a mechanical tip-up flag and/or electric light fish bite indicator, and a hooked fish indicator that is controlled by tension in the fish line to alert a fisherman of the occurrence of hooked fish and the relative size and/or strength of the hooked fish. The signaling device includes a base stand which is used to properly position and support the fish bite and hooked fish indicator mechanisms over the ice fishing hole. In one preferred embodiment, the base stand includes a pair of support legs that are configured to straddle the ice fishing hole. These support legs connect to an upstanding support arm or frame of the base stand through a folding joint block that permits the base stand to be disassembled and collapsed for ease of transportation. The base stand carries a fishing reel (preferably a rattle reel) upon which the fishing line is spooled. The mount for the reel includes a tension adjustment setting which allows the fisherman to make desired adjustments to the drag setting of the reel. The fishing line is strung from the reel to the hooked fish indicator mechanism, which is positioned over the ice fishing hole.

The hooked fish indicator is constructed in the form of a tubular housing with a telescoping movable indicator rod mounted therein. The movable indicator rod includes an eyelet on one end through which the fishing line is strung, and has a visually distinctive coloring, such as reflective neon orange, to enhance its visibility to the fisherman. The indicator rod is connected to a spring within the tubular housing to bias the indicator rod against movement from within the housing. As such, the spring-biased indicator rod functions as a movable resistance member within the tubular housing which, absent the presence of sustained tension on the fishing line from a hooked fish, remains seated at rest within the tubular housing.

In a preferred embodiment, the hooked fish indicator carries the trigger mechanism for actuating the mechanical tip-up flag type fish bite indicator. The trigger mechanism may be comprised of a small roller or catch member attached to the movable indicator rod which, upon an initial tug on the fish line, will release the tip-up flag indicator to signal the occurrence of a fish bite. The bite indicator is constructed of a flexible, bendable thin metal band or spring member with a fabric flag connected to one end for signaling the presence of a fish bite. The opposite end of the band is connected to the outer confines of the tubular housing, so that the flexible band may be bent over to engage the catch member secured to the indicator rod.

A tension adjustment mechanism is provided for adjusting the resistance of the movable indicator rod and setting a threshold level for the fish bite indicator. Consequently, in the event of a fish strike which exceeds the threshold level of tension applied to the fish line, the tip-up flag indicator is actuated to signal the presence of a fish bite. If the fish releases the bait (i.e., not "hooked"), the movable indicator rod will return to its rest position within the tubular housing. On the other hand, any sustained tension on the fish line equal to or exceeding the threshold level of the bite indicator will cause the indicator rod to move outwardly from within the tubular housing, thereby providing a positive visible signal to the fisherman that a fish has been hooked.

The hooked fish indicator not only provides a positive signal that a fish has been hooked, it also alerts the fisherman as to the relative size and/or strength of the hooked fish. Information as to the relative size and/or strength of the fish is important in determining the urgency with which the fisherman must tend the fishing line. Because the movable indicator rod is spring-biased to stay within the tubular housing, resistance to outward movement increases as the indicator rod is withdrawn further from the housing. As such, increased tension on the fish line translates into stronger resistance against movement by the indicator rod. Consequently, the further the indicator rod is pulled from the tubular housing, the larger or stronger the hooked fish is likely to be.

As an added signaling means, the hooked fish indicator may be electrically coupled to a light to provide intermittent illumination as fish bites occur, and provide continuous illumination or repeated blinking upon the presence of a fish being hooked. To implement this feature, the movable indicator rod may be configured with an electrical contact that closes an electrical circuit to illuminate the light upon an occurrence of a fish bite that meets or exceeds the threshold level of tension on the fishing line. If the fish releases the baited hook, the bias spring that controls movement of the indicator rod causes a break in electrical contact, thereby turning the light off. However, with sustained tension on the fishing line that meets or exceeds the threshold level of the fish bite indicator, the indicator rod is pulled from within the tubular housing, thereby maintaining electrical contact. Consequently, the light will remain illuminated (or blink repeatedly), thereby signaling the continued presence of a hooked fish. Such an illuminating light indicator is particularly useful at nighttime, when it becomes more difficult for a fisherman to see the reflective coating of the hooked fish indicator rod.

As an additional option, an aerator/bubbler unit is provided for maintaining water circulation within the ice fishing hole so as to prevent freeze-up of the hole. The aerator/bubbler unit sends air through a tube assembly and out and end nozzle to circulate the water on the top portion of the ice fishing hole, thereby preventing the formation of ice. The nozzle end is preferably bendable and flexible to allow the fisherman to dictate the direction of water movement. This allows the fisherman to center the water flow directly around the fishing line.

DRAWINGS

These and other objects and advantages of the invention will more fully appear from the following description, made in connection with the accompanying drawings, wherein like reference characters refer to the same or similar parts throughout the several views, and in which.

DETAILED DESCRIPTION

With reference now being made to the drawings, an exemplary embodiment is shown of an ice fishing signaling apparatus 1 embodying the principals of my invention. As seen best in FIGS. 1 and 2, the ice fishing signaling device 1 includes a base stand 3 which is used primarily to properly position and support a combined fish bite/hooked fish indicator assembly 5 over an ice fishing hole (not shown). In one preferred embodiment, the base stand 3 includes a pair of support legs 7a and 7b that extend generally horizontal to the ice and are configured to straddle the ice fishing hole. The support legs 7a and 7b converge at one end and curve upwardly into a folding junction block 9. Junction block 9 includes a central body portion 11 and pivotal left and right leg mounts 13 and 15 to which legs 7a and 7b connect, respectively. Leg mounts 13 and 15 are configured to pivot generally vertically about a horizontal axis relative to body portion 11 of junction block 9, such that legs 7a and 7b may be collapsed and folded upright into the remainder of the base stand 3 for ease of storage and transportation. Leg mounts 13 and 15, and central body portion 11 each have aligning apertures extending therethrough through which a locking pin 17 may be inserted to lock the left and right leg mounts 13 and 15 in their extended horizontal position during use.

Figure 1:
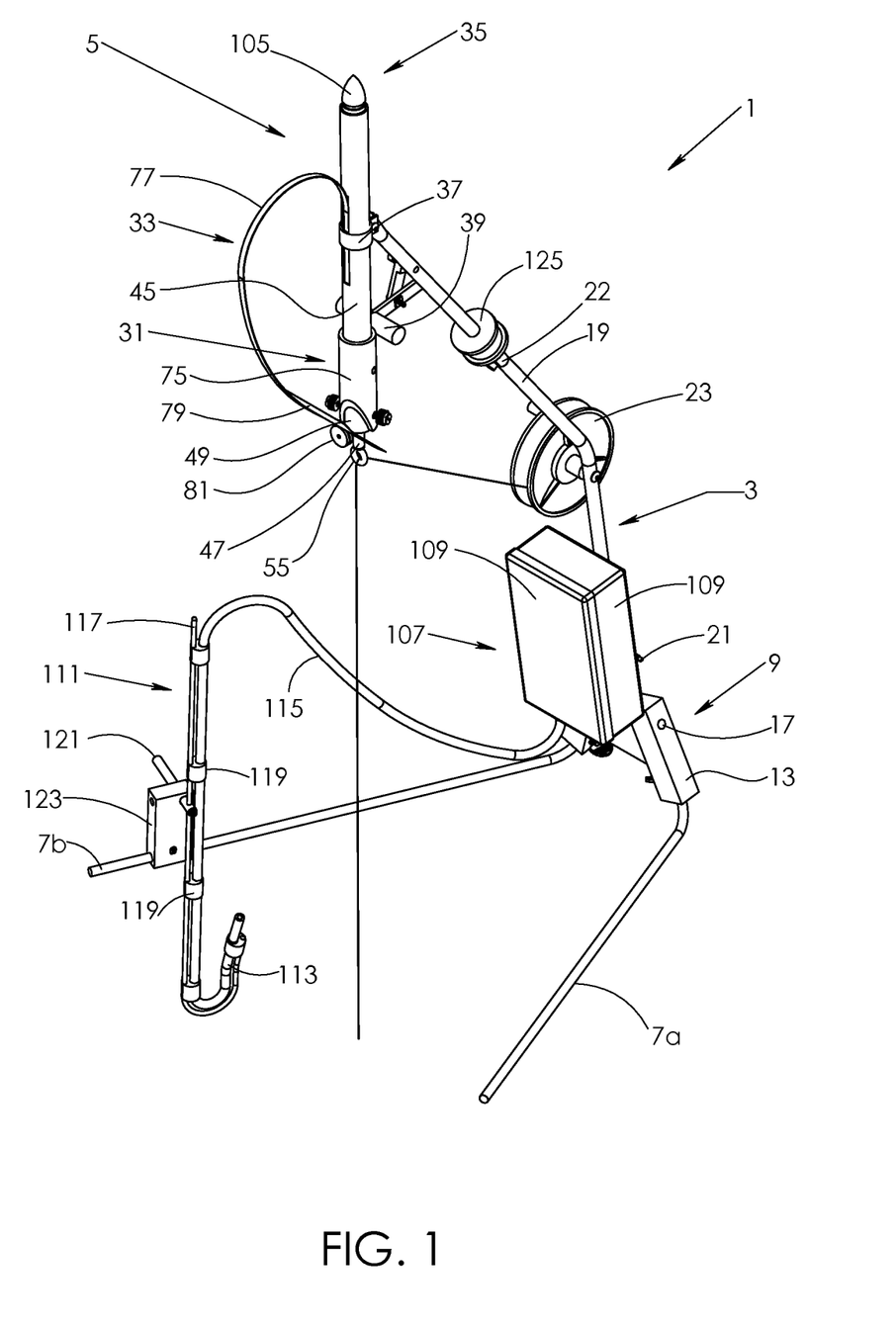
FIG. 1 is a front perspective view of an exemplary embodiment of an ice fishing signaling apparatus showing a fish bite/hooked fish indicator assembly embodying the principles of my invention.
Figure 2:
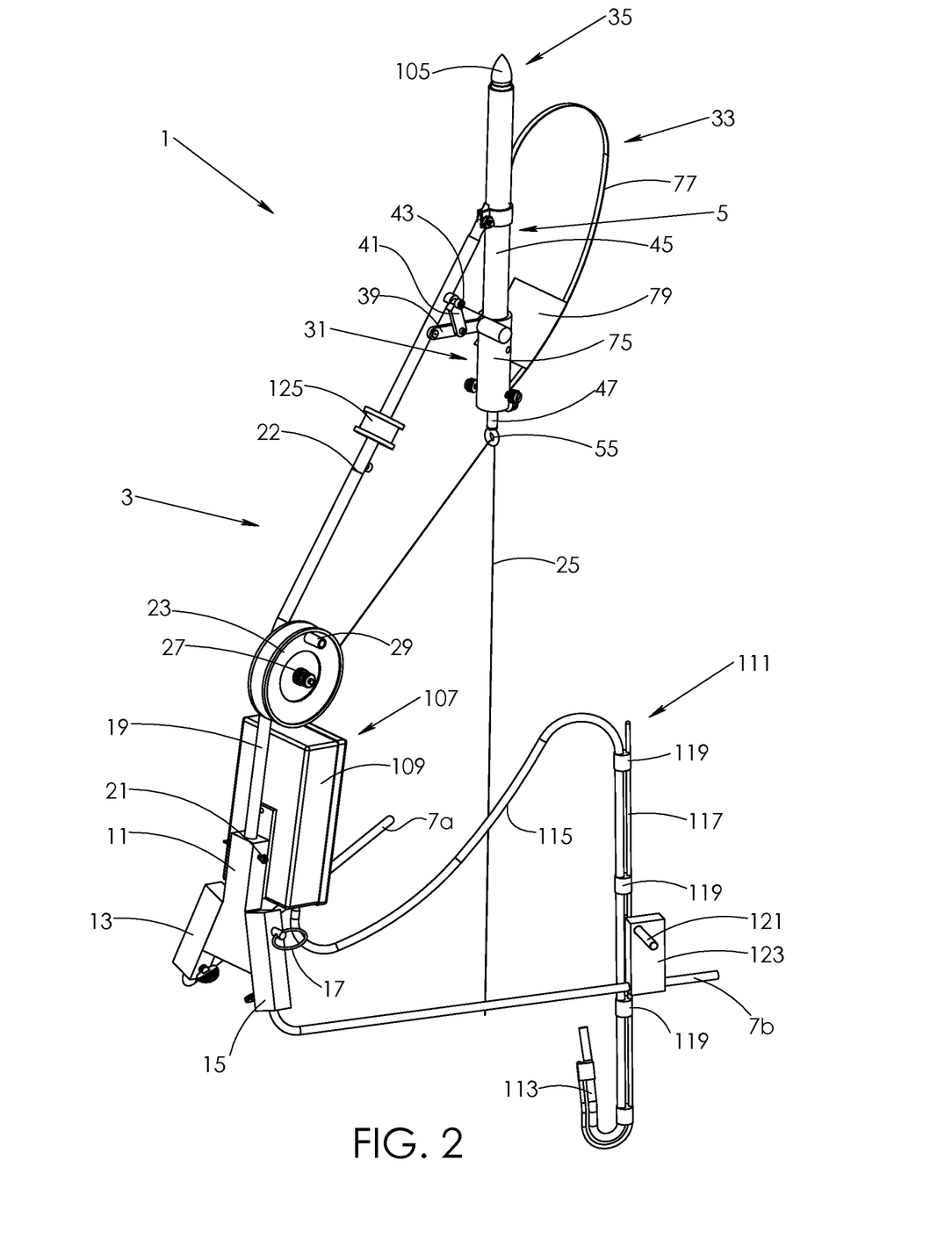
FIG. 2 is a rear perspective view of the ice fishing signaling apparatus shown in FIG. 1.

As further shown in FIGS. 1 and 2, a supporting arm or frame 19 extends upwardly from the junction block 9. Frame 19 is constructed as an elongated rigid support member that may be connected to junction block 9 via any suitable connecting means. For instance, and without limitation, frame 19 can be constructed as an elongated metal tubular element that is received within an opening in the top end of junction block 9 and held in place by a mechanical locking pin 21. Other configurations of frame 19 are also certainly conceivable without departing from the invention herein. Frame 19 may also be constructed with one or more separable joints 22 to facilitate further breakdown of the frame into modular components for ease of storage and transport.

Frame 19 is preferably constructed of metal, but it is contemplated that it could also be manufactured from a relatively rigid plastic material, provided it is capable of supporting the combined fish bite/hooked fish indicator assembly 5 during use. Frame 19 carries a fishing reel 23 (preferably a rattle reel) upon which fishing line 25 may be spooled. Fishing reel 23 may be connected to frame 19 by any suitable means, such as with a metal screw or the like extending through its central axis. As shown, the mount for reel 23 includes a tension adjustment knob 27 which allows the fisherman to make desired adjustments to the resistance or drag setting of the reel. The fishing line 25 is strung from the reel 23 to the Fish bite/hooked fish indicator assembly 5, which is positioned over the ice fishing hole. Reel handle 29 is provided for assisting in spooling and unspooling the fishing line 25 from the reel 23.

Figure 3:
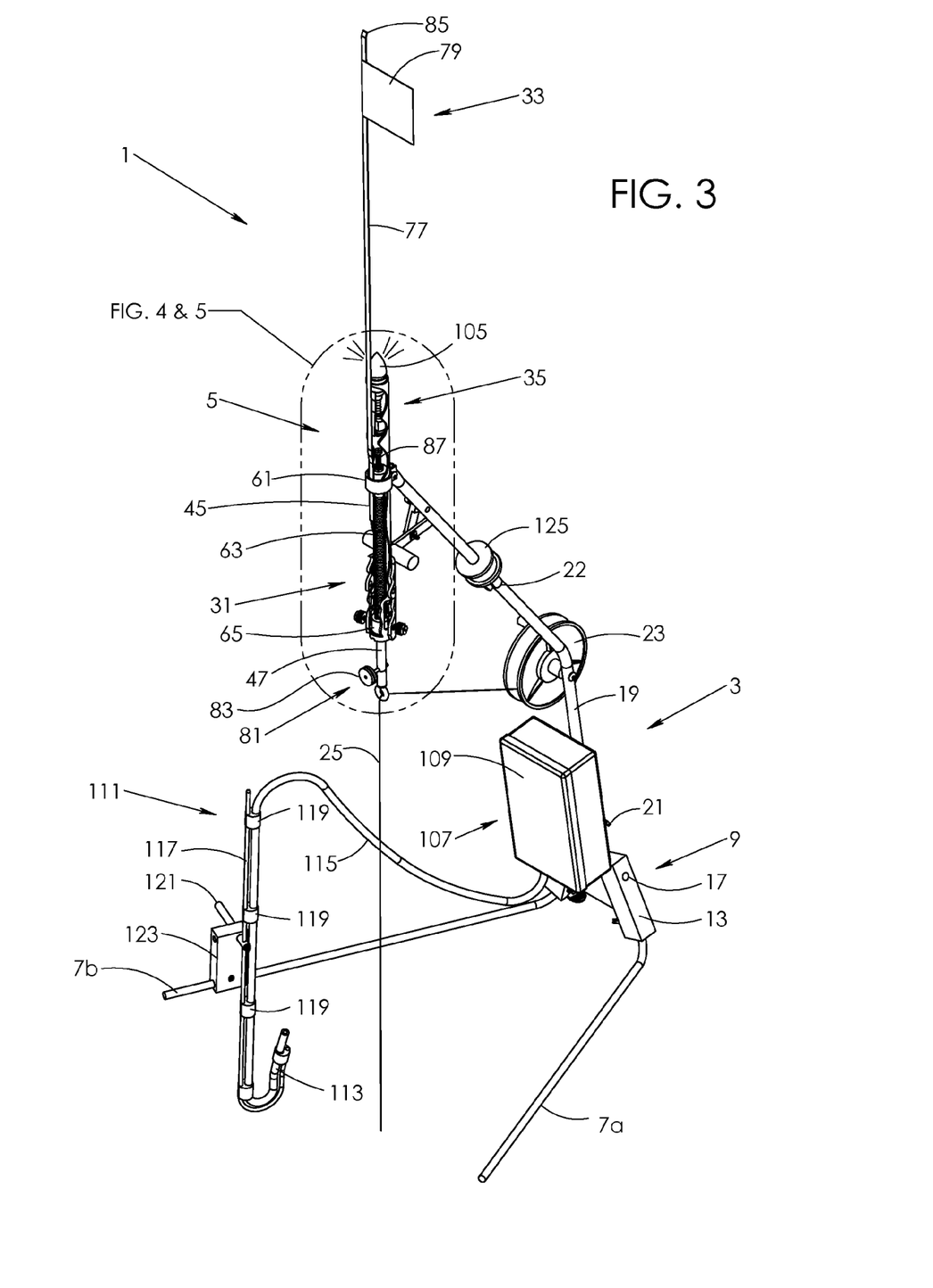
FIG. 3 is a front perspective view of the ice fishing signaling apparatus shown in FIG. 1, with the outer housing of the fish bite/hooked fish indicator partially broken away to show its internal working components.

As shown in each of FIGS. 1-3, the supporting frame 19 extends upwardly from the mounting position of the reel 23 at an angle of approximately twenty-five to thirty (25-30) degrees to a position above the supporting legs 7a and 7b of base stand 3, and directly over the ice fishing hole. Supported at the upper end of frame 19 is the combined fish bite/hooked fish indicator assembly 5. The indicator assembly 5 in comprised generally of a tubular "hooked fish" indicator 31, a mechanical tip-up flag type "fish bite" indicator mechanism 33 and an optional electric light indicator mechanism 35 connected in controlled relation to the hooked fish indicator for signaling the occurrence of a fish bite and/or hooked fish event during nighttime.

The fish bite/hooked fish indicator assembly 5 is mounted to the frame 19 via a tube clamp 37, which facilitates pivotal movement of the indicator assembly 5 relative to frame 19 for ease of storage and transportation. During normal use, the indicator assembly 5 is pivoted to a substantially upright vertical orientation, as shown in the drawings, but may be folded inwardly toward frame 19 for storage and transportation. As shown, a lock arm assembly 39 is also pivotally connected to frame 19 and used to maintain the indicator assembly 5 in an upright position during normal use. The lock arm assembly 39 includes a position latch 41 which engages a locking pin 43 on frame 19 in releasable locking relation for holding the lock arm assembly 39 in supporting relation to indicator assembly 5 during use.

Figure 4:
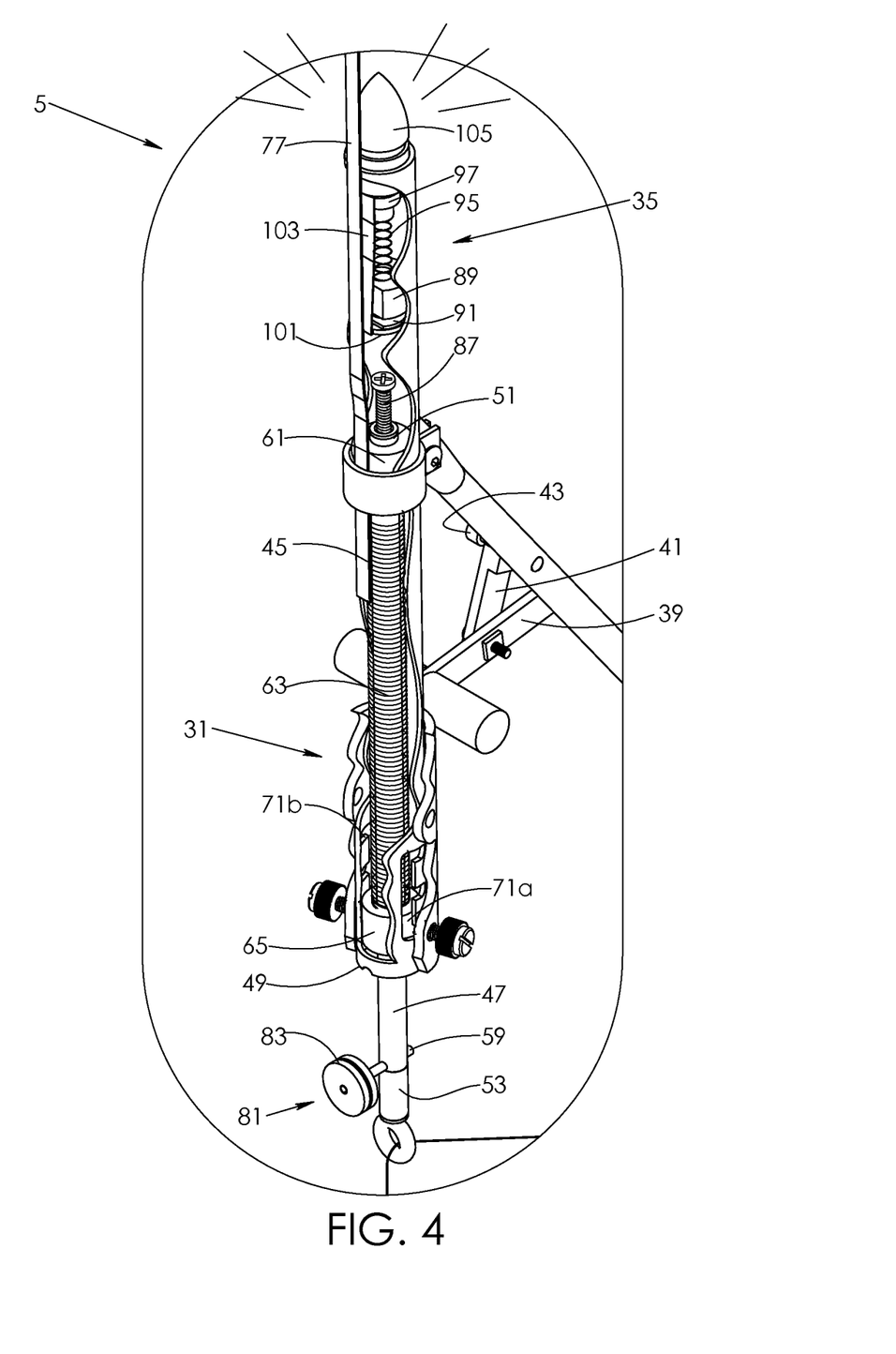
FIG. 4 is an enlarged perspective view of the fish bite/hooked fish indicator assembly shown in FIG. 3, with the outer housing thereof partially broken away to show the positioning and function of the internal components when signaling the occurrence of a hooked fish.
Figure 5:
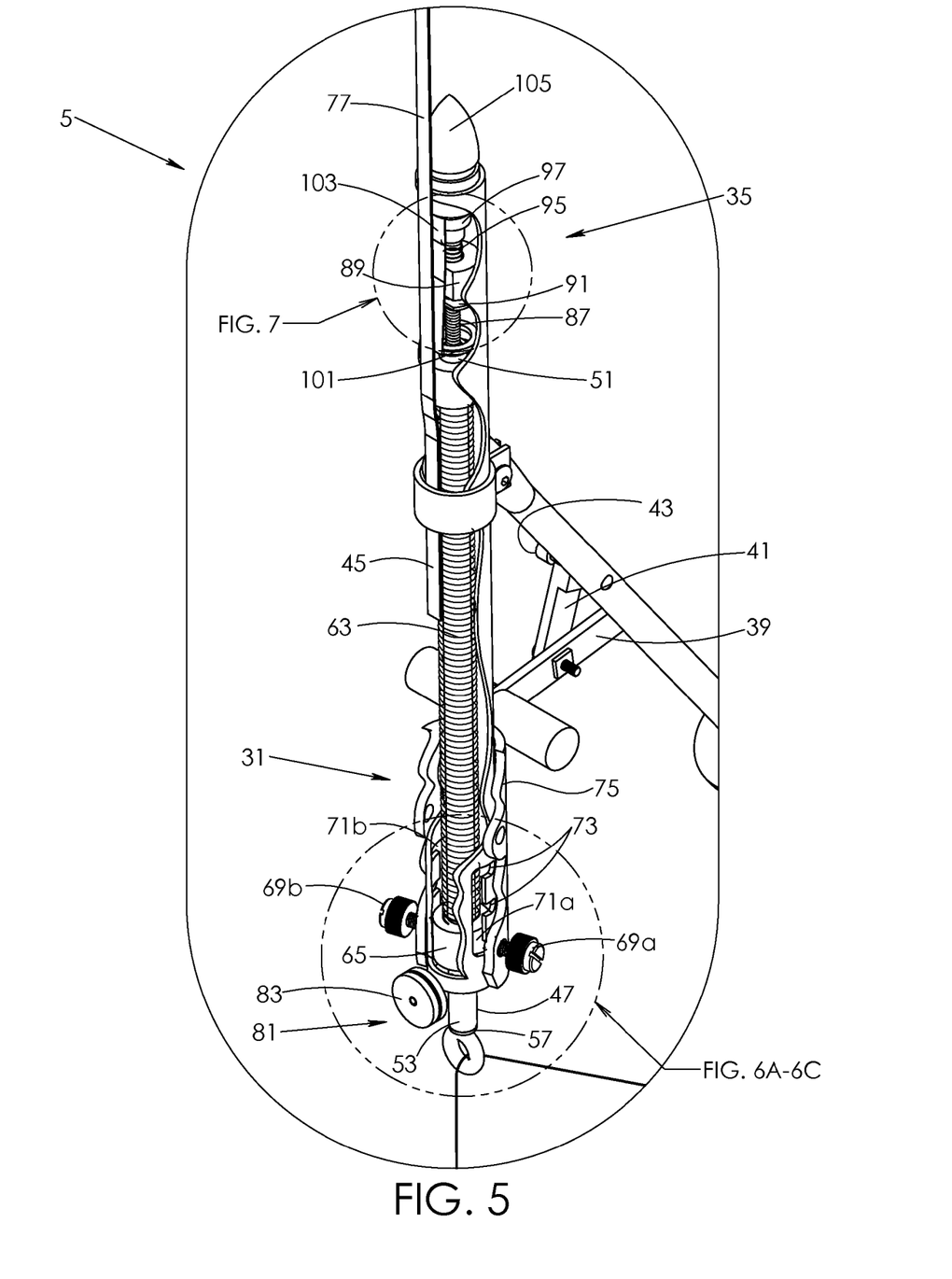
FIG. 5 is an enlarged perspective view of the fish bite/hooked fish indicator assembly shown in FIG. 3, with the outer housing thereof partially broken away to show the positioning and function of the internal components when at rest with no fish bite activity.

As shown further in FIGS. 1 and 2, the hooked fish indicator 31 of assembly 5 is constructed in the form of an elongated tubular housing 45 with a telescoping movable indicator rod 47 mounted therein. The indicator rod 47 may be tubular or solid in form, but for purposes of the present disclosure, is tubular in nature. As best shown in FIGS. 4 and 5, the housing 45 has an open lower end 49 through which the proximal end 51 of indicator rod 47 is received. The opposite distal end 53 of indicator rod 47 protrudes outwardly from the open lower end 49 of the housing 45, and has an eyelet or rod eye 55 mounted thereto through which the fishing line 25 from reel 23 is strung. In the embodiment shown, the eyelet 55 is threaded into a metal insert 57 that is press fitted into the end of the tubular indicator rod 47. A small compression pin 59 or any other suitable connecting means, such as an adhesive, may be used to secure the metal insert within the indicator rod 47.

As shown best in FIG. 4, mounted on the indicator rod 47 adjacent its proximal end 51 and movable therewith within the housing 45 is an upper housing guide member 61. Upper housing guide 61 functions to stabilize and support the indicator rod 47 within housing 45 as it reciprocates therein. Immediately below the upper housing guide 61 and carried by the indicator rod 47 is a compression bias spring 63. Spring 63 is preferably constructed in the form of an elongated coil spring through which indicator rod 47 extends longitudinally.

As shown best in FIGS. 4 and 5, one end of the bias spring 63 is seated in abutting relation against the upper housing guide 61 that is mounted on indicator rod 47. The opposite end of compression bias spring 63 is seated in abutting relation against a lower housing bushing guide 65 that surrounds indicator rod 47 adjacent the lower open end 49 of housing 45. The lower housing bushing guide 65 permits free guided movement of the indicator rod 47 through a central opening therein. As a consequence, movement of indicator rod 47 out of housing 45 has the effect of compressing bias spring 63 between the upper housing guide 61 and lower bushing guide 65. This effectively increases the resistance force of spring 63 as indicator rod 47 is pulled further from housing 45.

Figures 6A, 6B, 6C:
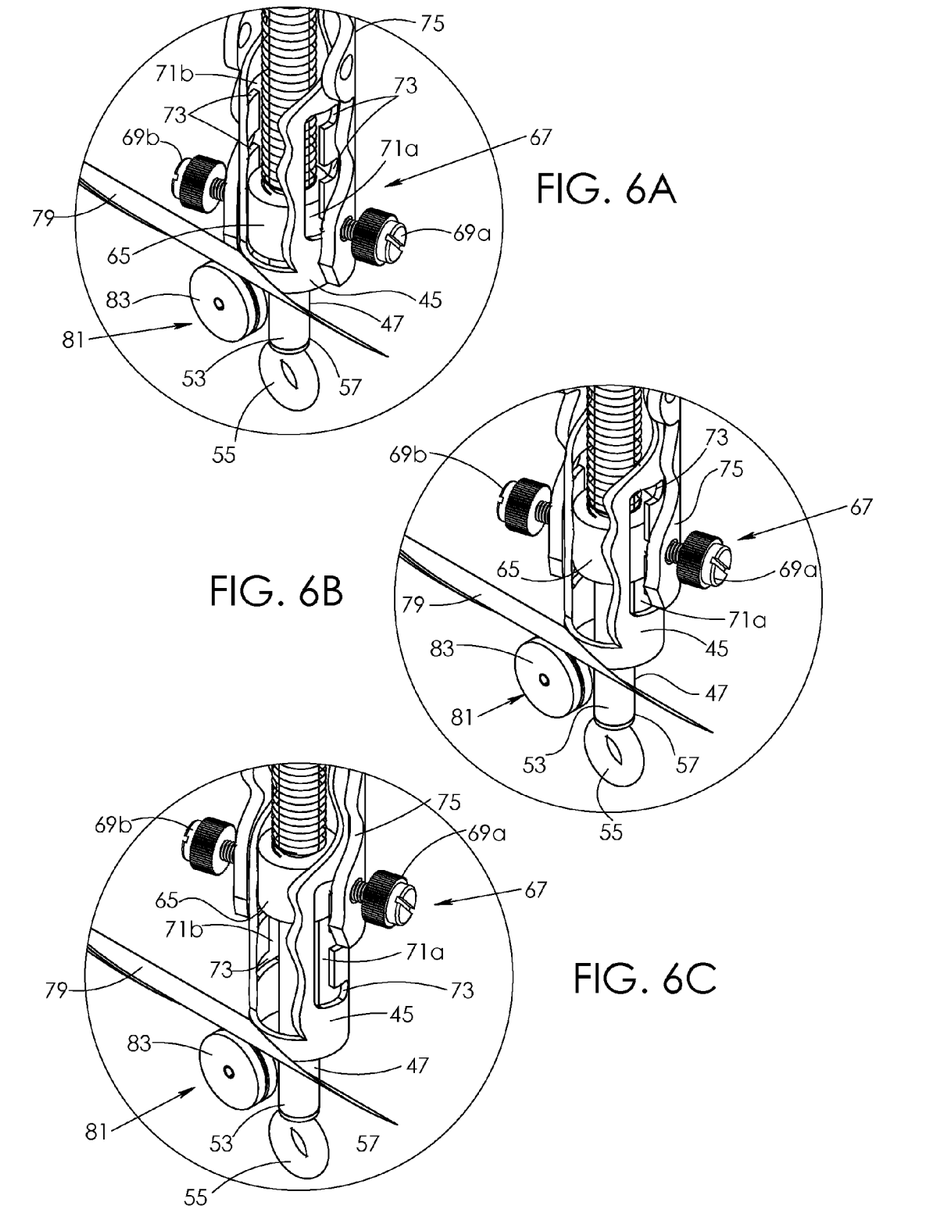
FIG. 6A is an enlarged partial perspective view of the tension adjustment assembly for the fish bite/hooked fish indicator assembly shown in FIG. 5, with the outer housing thereof partially broken away to show the adjustment setting at its lowest tension setting.
FIG. 6B is another enlarged partial perspective view of the tension adjustment assembly for the fish bite/hooked fish indicator assembly shown in FIG. 5, with the outer housing thereof partially broken away to show the adjustment setting at an intermediate tension setting.
FIG. 6C is still another enlarged partial perspective view of the tension adjustment assembly for the fish bite/hooked fish indicator assembly shown in FIG. 5, with the outer housing thereof partially broken away to show the adjustment setting at its highest tension setting.

With reference now to FIGS. 6A, 6B and 6C, it can be seen that bushing guide 65 is movably mounted within the tubular housing via a tension adjustment assembly 67 that facilitates adjustability of the compression spring 63. Consequently, by setting the position of bushing guide 65 within the tubular housing 45, the fisherman can effectively set the threshold spring resistive force or fishing line tension required to actuate the fish bite/hooked fish indicator assembly 5. To accomplish this, the tension adjustment assembly 67 includes a pair of threaded adjustment screws 69a and 69b which thread into opposite sides of the movable bushing guide 65. Adjustment screws 69a and 69b extend through elongated slotted openings 71a and 71b, respectively, formed on opposite sides of the tubular housing 45. Slots 71a and 71b thus permit movement of screws 69a and 69b, and consequently busing guide 65, up and down relative to tubular housing 45.

As shown in FIGS. 6A-6C, each of the slotted openings 71a and 71b are formed with a plurality of selectable setting positions 73 that permit positional adjustment of bushing guide 65 within housing 45, as desired. FIG. 6A shows the tension adjustment assembly at its lowest tension setting; FIG. 6B shows the tension adjustment assembly at an intermediate tension setting; and FIG. 6C shows the tension adjustment assembly at its highest tension setting. By rotating the bushing guide 65 slightly within housing 45, the adjustment screws 69a and 69b will slide into the selected setting position 73 of choice, thereby holding the bushing guide 65 in the position desired within housing 45. As also shown throughout the drawings, an outer tensioner guard or shroud 75 surrounds the lower end portion 49 of housing 45 so as to cover the slotted openings 71a and 71b therein. This helps prevent snow and ice from accumulating within housing 45 through slots 71a and 71b and impeding operation of the bias spring 63 and indicator rod 47 inside housing 45.

The bushing guide 65 may therefore be raised, lowered and rotated into any desired position to set the required compressive resistance of the bias spring 63. By raising the bushing guide 65, bias spring 63 is compressed slightly, thereby increasing the spring resistance and threshold tension on fishing line 25 required to cause movement of the indicator rod 47 out of housing 45. Lowering the bushing guide 65 has the opposite effect, thus lessening the compression of spring 63 and consequently lowering the threshold tension on fishing line 25 required to cause movement of the indicator rod 47 out of housing 45. By this means, the threshold level of tension required on fishing line 25 to detect a fish bite may be effectively set to the desired level by the fisherman using the device.

The fish bite indicator 33 incorporates a mechanical tip-up flag type indicator. Bite indicator 33 is constructed of a flexible, bendable thin metal band or leaf spring 77, one end of which is clamped to the tubular housing 45 by tube clamp 37, and the other end of which carries a fabric flag 79 for alerting the fisherman upon the occurrence of a fish bite. Band 77 is slidably retractable between housing 45 and tube clamp 37 so that it may be retracted to lay flat against the housing 45 during storage and transportation. In order to detect the occurrence of a fish bite meeting the required threshold level of line tension, the fish bite indicator 33 incorporates a trigger mechanism 81 that is controlled by movement of indicator rod 47. As seen best in FIG. 4, the trigger mechanism 81 is comprised of a small roller or catch member 83 that is attached to the distal end portion 53 of indicator rod 47 via pin 59. As shown best in FIGS. 1 and 2, to set the bite indicator 33, once extended, flexible band 77 of bite indicator 33 is bent over such that the terminal end 85 thereof lightly engages the catch member 83 of the trigger mechanism 81. With the band 77 held in a bent position, any appreciable fish bite that meets or exceeds the set threshold level of tension on fishing line 25 will cause downward movement of indicator rod 47 and release the band 77 from catch 83. As shown in FIG. 3, band 77 will then spring upwardly, raising flag 79 to alert the fisherman of a fish bite.

Upon actuation of the fish bite indicator 33, the fisherman is alerted to the presence of a fish biting at the baited hook. However, this does not provide a determination that a fish has actually taken the bait and become hooked. As seen in FIG. 4, only sustained tension on fishing line 25 that is equal to or greater than the threshold level of resistance set for bias spring 63 will activate the hooked fish indicator 31 (i.e., causing indicator rod 47 to be pulled from within housing 45). Because the spring 63 within tubular housing 45 is constructed and arranged to bias the indicator rod 47 against movement out of housing 45, if a fish releases the baited hook, the spring 63 will instantly draw the indicator rod 47 back into the tubular housing 45, as shown in FIG. 5. As such, the spring-biased indicator rod 47 functions as a movable resistance member within tubular housing 45 which, absent the presence of sustained tension on the fishing line 25 from a hooked fish, remains seated at rest within the tubular housing 45.

As is apparent from the above, when a hooked fish causes tension on the fishing line 25 to increase, the line pulls downward on eyelet 55 with greater force, thereby causing indicator rod 47 to move further outward from within tubular housing 45. Such movement has the effect of compressing bias spring 63 further between the upper housing guide 61 and lower bushing guide 65. As a consequence, the resistance force of spring 63 increases in direct relation to an increase in tension on the fishing line 25 (i.e., the further the indicator rod 47 is pulled from within housing 45, the stronger the resistance of spring 63). Therefore, any sustained tension on the fishing line 25 sufficient to cause movement of indicator rod 47, i.e., that is, equal to or greater than the threshold resistance level set by adjustment assembly 67, not only indicates the presence of a hooked fish, but also provides a relative indication of the strength and/or size of the fish being hooked.

The more the indicator rod 47 becomes exposed from within housing 45, the larger and/or stronger the fish is likely to be. Consequently, the fisherman is promptly alerted to the fact that a fish of significant size and/or strength has been hooked, which is important in determining the urgency with which the fisherman must tend the fishing line. To further enhance the capability of the fisherman to visually perceive the occurrence of a hooked fish and assess the potential size thereof, it is contemplated that at least a portion of distal end portion 53 of the indicator rod 47 should be coated with a visually distinctive coloring, such as reflective neon orange color, or other highly visible indicia.

As shown throughout the drawings, the fish bite/hooked fish indicator assembly 5 may also include an additional signaling means in the form of an electric light indicator 35. The hooked fish indicator 31 may be electrically coupled to a light indicator 35 to provide intermittent illumination as fish bites occur, and provide continuous illumination or repeated blinking upon the presence of a fish being hooked. As shown best in FIGS. 4, 5 and 7, to implement the electric light indicator 35, the indicator rod 47 is configured as an electrical switch for opening and closing the electrical circuit that energizes the light indicator 35. As shown best in FIG. 4, the movable indicator rod 47 includes a light actuator pin 87 extending upwardly from the proximal end 51 thereof. As shown in FIG. 5, the light actuator pin 87 engages a movable contact guide member 89 within housing 45. As will be described in more detail hereafter, the contact guide member 89 functions as an "on/off" switch mechanism for the electric light indicator 35.

Figure 7:
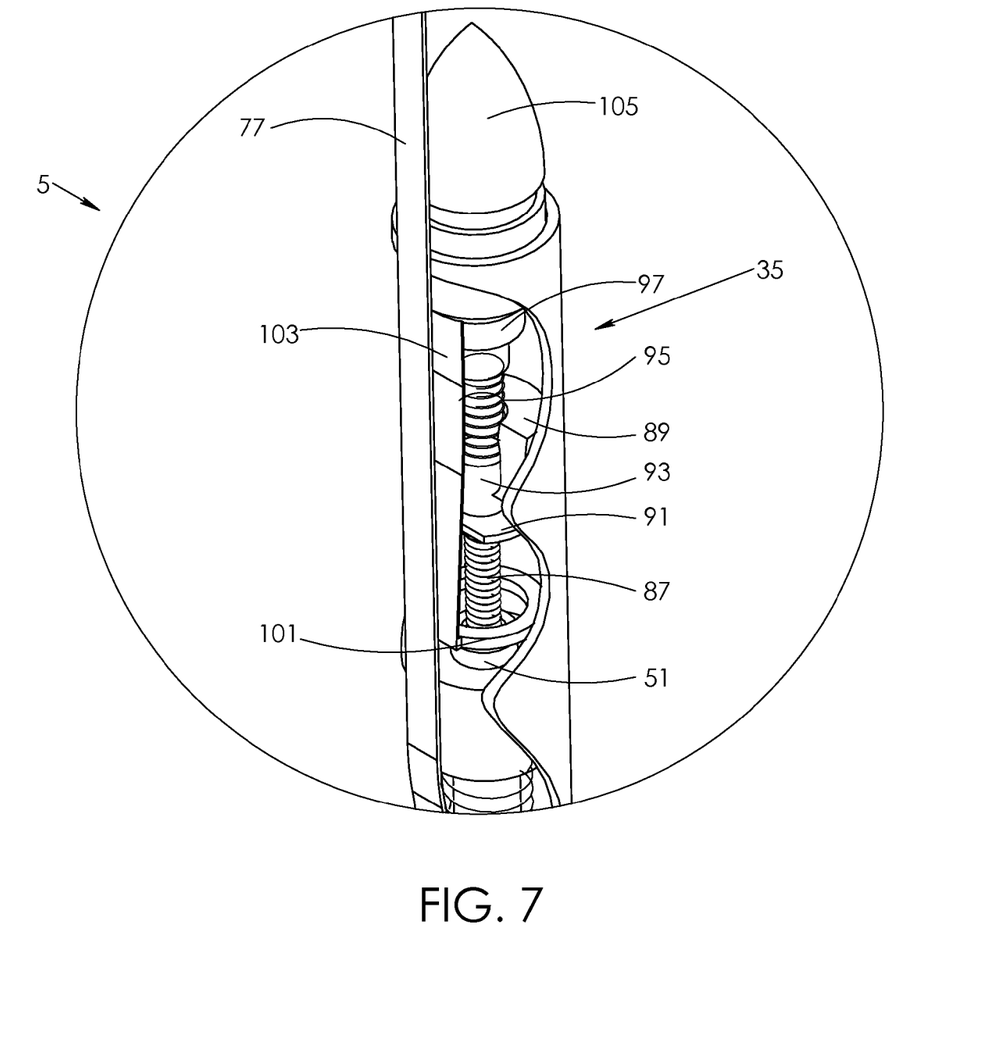
FIG. 7 is an enlarged partial perspective view of the electric light indicator assembly, with the outer housing thereof partially broken away to show the internal working components thereof.

As best shown in FIG. 7, the contact guide member 89 has a lower metal contact plate 91 with an upstanding post 93 that extends at least partly through the contact guide member 89. A light conductive spring 95 is connected to the post 93 and extends upwardly therefrom to the battery housing 97, where it is electrically coupled to the negative terminal of the batteries contained therein. Consequently, the spring 95 maintains electrical contact between the batteries and contact plate 91 as the contact guide member 89 moves in conjunction with indicator rod 47 within housing 45.

As further shown in FIG. 7, a second contact plate in the form of a copper washer 101 is positioned below the contact guide member 89. The copper washer 101 is electrically coupled to the opposite positive terminal end of battery housing 97 via a thin metal strip 103 extending upward thereto. As shown, the light 105 is also electrically coupled to the positive battery terminal. Thus, downward movement of contact guide member 89 to cause contact plate 91 to engage copper washer 101 will cause the electrical circuit to be closed, thereby energizing light 105

As noted above, movement of the contact guide member 89 is controlled by the light actuator pin 87 carried by indicator rod 47. As shown best in FIGS. 5 and 7, the light actuator pin 87 is constructed to extend through the central opening of copper washer 101 to engage the contact guide member 89. Consequently, as the indicator rod 47 moves further upward into the housing 45, pin 87 pushes the contact guide member 89 upwardly, breaking the electrical connection between the contact plate 91 and copper washer 101 and de-energizing lamp 105. However, as shown in FIG. 4, when the tension on fishing line 25 meets or exceeds the threshold level set for the fish bite/hooked fish assembly 5, the indicator rod 47 is pulled out of housing 45 and the contact guide member 89 is allowed to drop, thereby completing the electrical connection between contact plate 91 and washer 101, and energizing the lamp 105.

In a preferred embodiment, the light actuator pin 87 is threadably received within the proximal end 51 of the indicator rod 47, such that it may be adjusted inward and outward to set the amount of spacing between the contact plate 91 and copper washer 101 when at rest. This facilitates further adjustability of the sensitivity of the light indicator 35 by controlling the distance of travel necessary for indicator rod 47 to close the electrical circuit that energizes the light indicator 35.

As is evident from the above, closure of the electrical circuit is controlled and effected by movement of indicator rod 47. Therefore, upon an occurrence of a fish bite that meets the threshold level of tension in fishing line 25, indicator rod 47 will move downward causing the electrical circuit to close and illuminate light 105 (FIG. 4). If the fish releases the baited hook, the bias spring 63 will retract indicator rod 47 and cause a break in electrical contact, thus turning off light 105 (FIG. 5). However, with sustained tension on the fishing line 25 that meets or exceeds the threshold level set for the fish bite indicator 33, the indicator rod 47 is pulled outward from within tubular housing 45, thereby maintaining closure of the electrical contacts 91 and 101. Consequently, the light 105 will remain illuminated (or blink repeatedly), thereby signaling the continued presence of a hooked fish. Such an illuminating light indicator 35 is particularly useful at nighttime, when it becomes more difficult for a fisherman to see the reflective coating of the hooked fish indicator rod 47.

As an additional option, an aerator/bubbler unit 107 is provided for maintaining water circulation within the ice fishing hole so as to prevent freeze-up of the hole. As shown in FIGS. 1 and 2, the aerator/bubbler unit 107 includes an air flow unit 109 that may be secured to central body portion 11 of the folding junction block 9 or other convenient portion of the base stand 3. The air flow unit 109 transmits air through an adjustable hose assembly 111 and out an end nozzle portion 113 to circulate the water on the top portion of the ice fishing hole. The adjustable hose assembly 111 includes a hose 115 connected to an elongated hose support rod 117 via a plurality of hose clamps 119. The hose support rod 117 extends through a transverse opening formed in pivot pin 121 which, in turn, is pivotally mounted in orthogonal relation to a mounting block 123. Mounting block 123 is secured to one of the base support legs 7a or 7b, thereby securing the adjustable hose assembly 111 to the base stand 3 adjacent the ice fishing hole.

In this configuration, the hose support rod 117 is allowed to pivot vertically with pivot pin 121 about a horizontal axis relative to mounting block 123. This permits vertical adjustment of the hose assembly 111 relative to the ice fishing hole. The hose support rod 117 also pivots relative to the pivot pin 121, thereby permitting finer adjustments of the orientation of end nozzle portion 113 of hose 115 within the ice fishing hole to circulate or agitate the top surface of the water and prevent the ice fishing hole from freezing over.

The nozzle end 113 of the hose assembly 111 is preferably bendable and flexible to allow the fisherman to dictate the direction of water movement. This allows the fisherman to center the water flow directly at the surface of the waterline around the fishing line 25. In another embodiment, it is contemplated that hard airline sections (not shown) may be attached to make the adjustable hose assembly 111 extendable for use in an ice fishing house, where the house typically sits 12 to 18 inches above the ice surface. As many fishermen keep their ice fishing house in place for the entire ice fishing season, holes tend to freeze over, requiring them to reopen the holes with an ice auger or chisel. The hard airline extension sections allow the fisherman to leave the aerator unit 107 running while they are away so the ice fishing hole will not freeze over.

In still other embodiments, alternative configurations of the supporting base stand 3 may be implemented. By way of example, an exemplary embodiment of a tripod base stand with collapsible metal pointed legs is contemplated. This embodiment would utilize the same components for the fish bite/hooked fish indicator assembly 5 as in previous embodiments. However, the tripod base would include metal pointed legs to allow the legs to easily puncture the ice so the unit can stand in an upright position. The metal pointed legs could be made of metal tubing that separates half way down, with elastic cords secured inside the tubular sections to facilitate breaking the stand down and allowing the tripod legs to remain intact.

In use, the ice fishing signaling apparatus 1 is easily assembled by unfolding the support legs 7a and 7b from base stand 3 and folding out the fish bite/hooked fish indicator assembly 5 to its vertical orientation. The locking pin 17 may be inserted to lock the left and right leg mounts 13 and 15 in place, and the fish bite/hooked fish indicator assembly 5 may be supported in place by the lock arm assembly 39. The signaling apparatus 1 is then placed over the ice fishing hole with the support legs 7a and 7b straddling the ice fishing hole. If the aerator/bubbler unit 107 is used, it may be switched on and the hose support assembly 111 adjusted so the nozzle 113 of the air hose 115 is positioned against the side wall of the ice fishing hole. This allows the water on the top surface of the ice fishing hole to circulate, preventing it from freezing over.

The ice fisherman may then thread the fishing line 25 from the fishing rattle reel 23 through the rod eye 55 on the end of indicator rod 47 and place a hook and the appropriate bait at the end of the fishing line 25. The fisherman may then pull out the desired amount of fishing line 25 and drop the fishing line, hook, and bait into the ice fishing hole. The reel tension knob 27 may then be adjusted to set the tension or drag of the reel 23 by turning the knob clockwise or counterclockwise. To set the tip-up flag indicator 33, the ice fisherman pulls the indicator band 77 and fabric flag 79 upward and outward from the tube clamp 37 until the flag rod is fully extended, and then sets the end 85 of the flag rod on the catch 83. The ice fishing signaling apparatus 1 is now ready for the fisherman to catch fish.

There are four potential key indicators that may indicate to the ice fisherman that a fish is biting or striking the baited hook. The first alert occurs when the tension of the fishing line 25 first reaches the threshold level set by the bias spring 63 to cause indicator rod 47 to start lowering out of the tubular housing 45. At this point, the mechanical fish bite indicator (i.e., the tip-up flag indicator) 33 is triggered causing the band 77 with flag 79 to release from catch 83 and spring upward to a vertical position (FIG. 3). At the same time this occurs, the light indicator 35 is energized, thus illuminating the light bulb 105, which alerts the ice fisherman that a fish is biting the bait on fishing line 25.

At this point, if the fish releases the bait, the light 105 will go off and the hooked fish indicator rod 47 will retract to its normal resting position within housing 45. The ice fisherman then knows there is a fish present and biting the bait, but the fish is not hooked. However, if the fish continues to pull the fishing line 25 downward, increasing the tension on line 25, the hooked fish indicator 31 automatically activates. In this case, a sustained tension on fishing line 25 that equals or exceeds the set threshold level of bias spring 63 will cause indicator rod 47 to extend further out of the tubular housing 45. As a consequence, as shown in FIGS. 3 and 4, the indicator rod 47 exposes more of the visibly distinctive coating or indicia on rod 47, thus providing a positive indication of a hooked fish. With the sustained tension of the fishing line 25, the electric light indicator 35 also remains energized, thus illuminating the lamp 105 continuously, or causing it to blink repeatedly, depending on the circuitry used.

Since the resistance of the bias spring 63 increases with increased tension on the fishing line 25, the extent to which indicator rod 47 becomes exposed and visible to the ice fisherman also helps to alert the angler of the relative size and/or strength of the fish being hooked. Once the indicator rod 47 is fully extended within housing 45 and the fish continues to pull out more fishing line 25, the rattle reel 23 will begin to rattle. The noise generated from this rattle will alert the ice fisherman even further that a significant fish is on the hook, thereby alerting the angler of the urgency to tend the fishing line. The fisherman can then hook set the fish and begin the ice fishing retrieval process.

The ice fishing signaling apparatus 1 is easily disassembled by pulling the locking pin 17 from the mount block 9 and folding the support legs 7a and 7b inwardly toward the base stand 3. The lock arm assembly 39 can then be unlocked, allowing the indicator assembly 5 to collapse towards frame 19 of the signaling apparatus. The flag band 77 can also be retracted by pulling it downward towards the base of the unit. The fish hook may then be secured to the hook cushion 125 carried by frame 19 so as to ensure it is safely secured for storage and not left dangling. This disassembly allows the ice fishing signaling apparatus 1 to be more compact so it can be stored and transported with ease.

Certain terminology is used herein for purposes of reference only, and thus is not intended to be limiting. For example, terms such as "upper", "lower", "above", "below", "top", "bottom", "upward", "downward", "rearward", and "forward" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description only, and is not intended to be exhaustive or to limit the scope of the invention herein. Individual elements or features of a particular embodiment are generally not limited to that particular embodiment and, where applicable, may be interchangeable and used in other selected embodiments, even if not specifically shown or described as such. Accordingly, various changes may be made in the form, details, arrangement and proportions of the parts without departing from the scope of the invention, which comprises the matter shown and described herein, and set forth in the appended claims.

What is claimed is:

1. An ice fishing signaling device, comprising:
   a base member carrying a fishing line;
   a fish bite indicator supported by said base member in controlled relation to said fishing line, said bite indicator including a tension adjustment member for setting a threshold tension level required on said fishing line to actuate said bite indicator;
   a hooked fish indicator supported by said base member in controlled relation to said fishing line, said hooked fish indicator including a visually perceptible and movable resistance member for signaling relative levels of sustained tension on said fishing line which are greater than said threshold tension level, said hooked fish indicator including a tubular member within which said movable resistance member is telescopically received, said movable resistance member being comprised of an inflexible rod that is pulled out of said tubular member upon actuation of said bite indicator so as to become increasingly more visible with increasing tension on said fishing line; and
   said resistance member being disposed and visually perceptible above water level in a fishing hole during use, and increasingly resistant to movement in response to an increase in tension on said fishing line, thereby providing a visual indication of a relative size or strength of a hooked fish.

2. The signaling device set forth in claim 1, wherein said movable resistance member is comprised of a spring-biased elongated rod that carries a visibly distinct outer coating.

3. The signaling device set forth in claim 1, wherein said movable resistance member is spring-biased against being pulled out of said tubular member, such that increased visibility of said movable resistance member indicates an occurrence of a larger or stronger fish being hooked.

4. The signaling device set forth in claim 1, wherein said movable resistance member has a free end disposed adjacent an open end of said tubular member, said free end having an eyelet connected thereto through which said fishing line extends, such that tension created on said fishing line in excess of said threshold level causes said movable resistance member to move outwardly from within said tubular member.

5. The signaling device set forth in claim 1, including an electric light source electrically coupled to said bite indicator and said hooked fish indicator, said electric light source being energized upon actuation of said bite indicator, but only remaining energized by a sustained level of tension on said fishing line which is at least equal to or greater than said threshold tension level.

6. The signaling device set forth in claim 1, wherein said movable resistance member is spring-biased to increase resistance in response to an increase in tension on said fishing line.

7. The signaling device set forth in claim 1, wherein said fish bite indicator is comprised of a visually perceptible signaling member including at least one of a group comprising a tip-up flag and an electric light source.

8. The signaling device set forth in claim 1, including a water circulating mechanism adapted to extend within an ice fishing hole to prevent said ice fishing hole from freezing over, said water circulating mechanism being comprised of an air pump for injecting air into the water within said ice fishing hole.

9. The signaling device set forth in claim 8, wherein said air pump includes a hose extending into said ice fishing hole, at least an end portion of said hose being adjustably flexible.

10. The signaling device set forth in claim 1, wherein said base member is collapsible for easy portability.

11. An ice fishing signaling device, comprising:
a base member carrying a fishing line;
a fish bite indicator supported by said base member in controlled relation to said fishing line, said bite indicator including a tension adjustment member for setting a threshold tension level required on said fishing line to actuate said bite indicator;
a hooked fish indicator being supported by said base member and including a tubular member within which a movable resistance member is telescopically received, said resistance member being disposed and visually perceptible above water level in a fishing hole during use, and engaged by said fishing line in controlled relation for signaling relative levels of sustained tension on said fishing line which are greater than said threshold tension level;
said resistance member being constructed to resist movement outward from within said tubular member, such that a sustained level of tension on said fishing line which is at least equal to or greater than said threshold tension level is required to maintain said resistance member at a position at least partially withdrawn from within said tubular member; and
said resistance member being comprised of an inflexible rod that is increasingly pulled out of said tubular member upon actuation of said bite indicator with increasing tension on said fishing line, thereby providing a visual indication of a size and/or strength of a fish that has been hooked.

12. The signaling device set forth in claim 11, wherein said resistance member carries a visibly distinct outer coating to enhance its visibility.

13. The signaling device set forth in claim 11, wherein said movable resistance member has a free end disposed adjacent an open end of said tubular member, said free end having an eyelet connected thereto through which said fishing line extends, such that tension created on said fishing line in excess of said threshold level causes said movable resistance member to move outwardly from within said tubular member.

14. The signaling device set forth in claim 11, including an electric light source electrically coupled to said bite indicator and said hooked fish indicator, said electric light source being energized upon actuation of said bite indicator, but only remaining energized by a sustained level of tension on said fishing line which is at least equal to or greater than said threshold tension level.

15. The signaling device set forth in claim 11, wherein said fish bite indicator is comprised of a visually perceptible signaling member including at least one of a group comprising a tip-up flag and an electric light source.

16. The signaling device set forth in claim 11, wherein said base is constructed to straddle an ice fishing hole and support said bite indicator and said hooked fish indicator in an elevated position over said ice fishing hole, such that a telescopic movement of said resistance member within said tubular member is vertically oriented over said ice fishing hole.

17. The signaling device set forth in claim 11, including a water circulating mechanism adapted to extend within an ice fishing hole to prevent said ice fishing hole from freezing over, said water circulating mechanism being comprised of an air pump with a flexibly adaptive hose for injecting air into the water adjacent the top of said ice fishing hole.

18. The signaling device set forth in claim 11, wherein said base member is collapsible for easy portability.

19. An ice fishing signaling device, comprising:
a base member carrying a fishing reel about which a fishing line is spooled;
a fish bite indicator supported by said base member in controlled relation to said fishing line, said bite indicator being constructed to require a predetermined threshold level of tension on said fishing line for actuating said bite indicator, said bite indicator being comprised of at least one of a group of visual indicators consisting of a tip-up flag indicator and an electric light source indicator;
a hooked fish indicator being supported by said base member and including a tubular member within which a movable resistance member is telescopically received, said resistance member having a visually distinctive outer coating relative to said tubular member and being engaged by said fishing line in controlled relation for signaling relative levels of sustained tension on said fishing line which are greater than said threshold tension level;
said resistance member being spring-biased within said tubular member to resist movement of said resistance member outward from within said tubular member, such that a sustained level of tension on said fishing line which is at least equal to or greater than said threshold tension level is required to maintain said resistance member at a position at least partially withdrawn from within said tubular member; and
said resistance member being disposed and visually perceptible above water level in a fishing hole during use, and increasingly pulled out of said tubular member upon actuation of said bite indicator with increasing tension on said fishing line, thereby providing a visual indication of a size and/or strength of a fish that has been hooked.

20. An ice fishing signaling device, comprising:
a base member carrying a fishing line;
a fish bite indicator supported by said base member in controlled relation to said fishing line, said bite indicator including a tension adjustment member for setting a threshold tension level required on said fishing line to actuate said bite indicator;
a hooked fish indicator supported by said base member in controlled relation to said fishing line, said hooked fish indicator including a visually perceptible and movable resistance member for signaling a sustained level of tension on said fishing line which is at least equal to or greater than said threshold tension level;
said resistance member being increasingly resistant to movement in response to an increase in tension on said fishing line, thereby providing an indication of a relative size or strength of a hooked fish; and
a water circulating mechanism adapted to extend within an ice fishing hole to prevent said ice fishing hole from freezing over, said water circulating mechanism being comprised of an air pump for injecting air into the water within said ice fishing hole.

21. The signaling device set forth in claim 20, wherein said air pump includes a hose extending into said ice fishing hole, at least an end portion of said hose being adjustably flexible.

22. An ice fishing signaling device, comprising:
a base member carrying a fishing line;
a fish bite indicator supported by said base member in controlled relation to said fishing line, said bite indicator including a tension adjustment member for setting a threshold tension level required on said fishing line to actuate said bite indicator;

a hooked fish indicator being supported by said base member and including a tubular member within which a movable resistance member is telescopically received, said resistance member being engaged by said fishing line in controlled relation for signaling a sustained level of tension on said fishing line which is at least equal to or greater than said threshold tension level;

said resistance member being constructed to resist movement outward from within said tubular member, such that a sustained level of tension on said fishing line which is at least equal to or greater than said threshold tension level is required to maintain said resistance member at a position at least partially withdrawn from within said tubular member;

said resistance member being increasingly pulled out of said tubular member with increasing tension on said fishing line, thereby providing a visual indication of a size and/or strength of a fish that has been hooked; and a water circulating mechanism adapted to extend within an ice fishing hole to prevent said ice fishing hole from freezing over, said water circulating mechanism being comprised of an air pump with a flexibly adaptive hose for injecting air into the water adjacent a top of said ice fishing hole.

* * * * *